United States Patent Office 3,663,581
Patented May 16, 1972

3,663,581
PROCESS FOR THE PROTECTION OF AUTO-OXIDIZABLE MATERIALS
Gunter Lehmann, Saarbrucken, Otto Neunhoeffer, Homburg, Saar, Wilhelm Roselius, Bremen-St. Magnus, and Otto Vitzthum, Bremen, Germany, assignors to Hag Aktiengesellschaft, Bremen, Germany
No Drawing. Filed Feb. 11, 1970, Ser. No. 10,595
Int. Cl. C11b 5/00
U.S. Cl. 260—398.5
3 Claims

ABSTRACT OF THE DISCLOSURE

A process for protecting auto-oxidizable materials through the addition of an antioxidative substance in the form of an extract of green coffee beans.

It is known that the undesired auto-oxidation of auto-oxidizable materials can be prevented or at least retarded by the addition of antioxidants. It is further known that a series of natural and synthetic substances have such antioxidative action, as for example tocopherols, gallic acid, ascorbic acid, sorbic acid and their derivatives, sulfites, etc. However, these substances are often not easily obtained and their uses, particularly in the case of foods, are frequently questionable.

It has now been found that substances that are susceptible to auto-oxidation can be protected against impairment resulting from such oxidation by the addition of substances having an antioxidative action, if there is used as antioxidative an extract of green coffee beans. This extract is advantageously obtained by:

(a) dissolving in hot water the caffeine extract obtained in a known manner from green coffee beans,
(b) cooling the hot aqueous phase whereby coffee wax is separated on the surface and the caffeine is deposited as a sediment,
(c) removing the caffeine, making the aqueous solution containing the coffee wax strongly alkaline and separating the aqueous alkaline phase,
(d) extracting the separated aqueous alkaline phase with an aliphatic halohydrocarbon and separating the aqueous alkaline phase from the organic phase,
(e) acidifying this aqueous alkaline phase with a mineral acid,
(f) extracting the acid aqueous solution with a water-immiscible solvent, drying the solvent phase and drawing off the solvent.

The residue remaining after the solvent is drawn off is a brown substance of oily consistency having an exceedingly pronounced antioxidative action which, in itself, is also an object of the present invention.

Substances susceptible of undergoing auto-oxidation, that are protected from such oxidation in accordance with the present invention, are above all light-and air-sensitive food articles, such as fats, oils, aromatic substances and powdered milk, but also plastics for the preparation of consumer goods and packaging materials. It is particularly advantageous to add the antioxidant obtained in accordance with the present invention to roasted coffee to increase the keeping quality thereof. The quantity of added antioxidant lies, in all cases, in the range between 0.01 to 5% by weight, preferably 0.1 to 2% by weight, based upon the quantity of material to be protected.

In the preparation of the antioxidative-active substance in accordance with the present invention, the green coffee beans used as starting material (which may or may not be comminuted) are extracted in a known manner, for example in accordance with German Pat. 198,279, German Pat. 538,439 and British Pat. 625,365, with a caffeine extraction solvent (aliphatic halohydrocarbons, such as $CHCl_3$, $CH_2Cl_3$, $CCl_4$, dichloroethylene, trichloroethylene, benzene, ethyl acetate, under certain conditions also ether, etc.) The extract is treated for the removal of the solvent and then dissolved in hot water. Beneficial effects are obtained, if the extract, at first, is not completely thickened by evaporation and if the residual caffeine extraction solvent is removed by a jet of steam. The steam that condenses at the surface of the extract serves at the same time to make up the caffeine extraction residue.

At this point, the hot aqueous phase is allowed to cool off (to about room temperature) whereby coffee wax is separated on the surface and the caffeine is deposited as a sediment, the latter being recovered for example by decanting or with the aid of a discharge device at the bottom of the reaction vessel, leaving behind only an aqueous solution and the coffee wax.

This aqueous solution, if necessary after modifying the volume of liquid, is made strongly alkaline by means of a basic substance, most efficiently with NaOH or KOH, so as to provide a preferred pH-value in the range 12–14, the optimum value being 13. The solution is then heated if necessary to about 50–70° C. and vigorously agitated, by shaking or stirring, together with the coffee wax, the latter being then separated suitably after cooling to room temperature.

The aqueous alkaline phase is now extracted with an aliphatic halohydrocarbon, preferably with $CCl_4$, $CHCl_3$, $CH_2$, $Cl_2$, di- or trichloroethylene, and the aqueous phase is separated from the organic phase. The strongly alkaline aqueous extract is acidified with a mineral acid, preferably with 5 N HCl or $H_2SO_4$.

The aqueous solution, which is now acid, is extracted with a water-immiscible solvent, for example ethyl acetate, chloroform, etc., preferably with ether (diethyl ether, diisopropyl ether). The solvent phase is then separated, dried in the usual manner and the solvent drawn off, leaving behind a brown oil. From 100 grams finely ground green coffee beans it is possible to obtain about 10 milligrams of a brown oil having an antioxidative action.

This brown oil, according to several orientating chromatographic tests, does not represent a unitary substance but rather a mixture that includes even crystalline bodies.

A preferred way of carrying out the process in accordance with the invention is as follows: after dissolving the caffeine extraction residue obtained from the green coffe beans with hot water, and after cooling the hot aqueous phase, the resulting three phase mixture (precipitated caffeine, aqueous phase, coffee wax) is separated. The aqueous phase is made strongly alkaline, so as to arrive at a preferred pH-value in the range from 12–14, the optimum value being 13. The coffee wax layer is also made alkaline with strong aqueous lye, preferably NaOH or KOH, having a pH-value in the range from 12–14, preferably 13, is extracted, and the two aqueous alkaline phases are treated separately in the manner described for the joint treatment thereof (extraction with aliphatic halohydrocarbons etc.) whereupon the two end products, after the removal of the solvent, are united.

By this preferred way of carrying out the process, it is possible to arrive at a cleaner end product.

There are other possibilities of isolating a product obtained from green coffee beans that is very similar to the highly antioxidative oil just described, for example by extraction of the green coffee beans with an aqueous lye followed by a liquid-liquid extraction with a water-immiscible solvent.

The art has taught that it could not be expected to isolate from crude green coffee beans an antioxidative substance as effective as those of the present invention, since in the past it was commonly believed that the antioxidative properties (substances) of coffee developed only upon roasting (see Journal Sci. Ind. Res. India 17c, p. 147, 1958, right column, item 5 of the abstract). It was therefore very surprising to find that it is possible to obtain by the process of this invention from green coffee beans a highly antioxidative active principle. The very high degree of antioxidative activity of the oils obtained in accordance with the invention, is shown by the following auto-oxidation tests of benzaldehyde carried out with air-oxygen under the same conditions at room temperature in the presence of known antioxidants and the oil according to the invention:

| Auto-oxidation of— | Antioxidant | $O_2$-absorption in microliters | After— |
|---|---|---|---|
| 0.1 ml. $C_6H_5CHO$ | 4.4 mg. D,L-tocopherol | 150 | 7 hours. |
| | 5.6 mg. n-propyl-gallate. | 150 | 5 hours. |
| | 6.1 mg. Nor-dihydro-guaiaretic acid. | 150 | 3 hours. |
| | 7.3 mg. oil according to the invention. | 140 | 30 hours. |

According to the test results listed in the above table, the oil obtained from green coffee beans by the process of this invention has an antioxidative action that surpasses by far even that of tocopherol which is known to be one of the most potent organic antioxidants.

The oil obtained in accordance with this invention is odorless and tasteless and obviously also non-poisonous and harmless. It is therefore eminently suitable for use in food articles; since the green coffee beans used as starting materials for the oil are known to be unobjectionable from the standpoint of palatableness, and since the preparation of the oils does not involve the use of conditions that fundamentally alter these substances, it is apparent that the oils are particularly desirable for use in food articles and would be in conformance with regulations pertaining to food ingredients.

Needless to say, the oils prepared in accordance with the invention can also be utilized admixed with other antioxidants for the protection of auto-oxidizable substances. The addition can be made either to the particular end product, in which case it is recommended to mix thoroughly, or during a suitable step of its manufacturing process, or partly during this step and partly to the end product.

Examples illustrating the process of the invention (1) and the use of the substances prepared thereby (2–5).

(1) 50 liters of the aqueous phase obtained as a result of the caffeine extraction in accordance with step (b) page 2, upon removal of the caffeine precipitated in the course of cooling, is made alkaline with 1 liter of 5 N NaOH. Residual caffeine is removed by consecutive agitations carried out with 25 liters, 20 liters, 15 liters, 15 liters, 10 liters, 10 tiiersl fl etaoin
15 liters, 10 liters, 10 liters of chloroform. The aqueous alkaline phase is acidified with 3.5 liters 5 N HCl and the acid solution is agitated by shaking with 35 liters, 25 liters, 15 liters, 15 liters of ether. The combined ether extracts are dried over sodium sulfate and the ether is distilled off. This leaves behind 140 grams of a brown oil having high antioxidative activity.

(2) To a roasted coffee extract containing 18% by weight of solid matter, there is added 0.1% by weight, based upon the total coffee extract, of the oil obtained in accordance with the invention. The extract is then concentrated in a vacuum to a solids content of 30%, whereby the volatile aromatic substances are recovered separately by condensation into a cooling device. These are combined with the same amount by weight of the antioxidant that was used for the coffee extract and this mixture is applied as a spray onto the dry powder of the roasted coffee extract. There is obtained a highly aromatic stable product.

(3) Roasted coffee beans are treated with a spray of 0.05% by weight of the oil prepared in accordance with the invention suspended in an aqueous phase, and are then finely ground in the presence of an inert gas. The ground roasted coffee powder is distinguished by its outstanding flavor stability.

(4) Aniseeds are treated by spraying thereon 0.5% by weight of the oil obtained according to the invention, which is suspended in 10 parts by weight of an 0.3 weight percent aqueous ethanol solution of sodium citrate, whereupon they are dried and ground in the usual way. The resulting anis powder has a stable flavor.

(5) Linseed oil to be used for dietary purposes is mixed with 0.1% by weight of the oil obtained according to the invention. The resulting product is stable even in containers that were opened.

We claim:
1. Process for the protection of auto-oxidizable materials by the addition of substances having an antioxidative action which is characterized in that there is used as substance having an antioxidative action an extract of green coffee beans obtained by
   (a) dissolving in hot water the caffeine extract obtained from green coffee beans,
   (b) cooling the hot aqueous phase whereby coffee wax separates on the surface and caffeine is deposited as a sediment which is removed,
   (c) upon removal of the caffeine, making the aqueous phase containing the coffee wax strongly alkaline and separating the aqueous alkaline phase from the coffee wax,
   (d) extracting the separated aqueous alkaline phase with an aliphatic halohydrocarbon and separating the aqueous alkaline phase from the organic phase,
   (e) acidifying the aqueous alkaline phase with a mineral acid,
   (f) extracting the acid aqueous solution with a water-immiscible solvent, drying the solvent phase and drawing off the solvent.

2. Process according to claim 1, which is characterized in that the three-phase mixture obtained in step (b) is separated, the aqueous phase is made strongly alkaline, the coffee wax layer is extracted with a strong aqueous lye and the two aqueous alkaline phases are treated separately from each other in accordance with steps d–f, and the two end products, upon removal of the solvent, are united.

3. An aqueous extract having an antioxidative action obtained from green coffee beans by
   (a) dissolving the caffeiene extraction residue obtained from green coffee beans in hot water,
   (b) cooling the hot aqueous phase, whereby coffee wax separates on the surface and caffeine is deposited as a sediment which is separated,
   (c) upon removal of the caffeine, making the aqueous phase containing the coffee wax strongly alkaline and separating the aqueous alkaline phase from the coffee wax,
   (d) extracting the separated aqueous alkaline phase with an aliphatic halohydrocarbon and separating the aqueous alkaline phase from the organic phase,
   (e) acidifying the aqueous alkaline phase with a mineral acid,
   (f) extracting the acid aqueous solution with a water-immiscible solvent, drying the solvent phase and drawing off the solvent.

References Cited
UNITED STATES PATENTS 2,314,988  3/1943  Johnston et al. _____ 99—163
2,744,834  5/1956  Robinson _____ 106—270

ELBERT L. ROBERTS, Primary Examiner